(12) United States Patent
Kirsten et al.

(10) Patent No.: US 6,855,760 B1
(45) Date of Patent: Feb. 15, 2005

(54) DETACHABLE ADHESIVE COMPOUNDS

(75) Inventors: Christian N. Kirsten, Monheim (DE); Peter Christophliemk, Duesseldorf (DE); Ralph Nonninger, Saarbruecken (DE); Herrmann Schirra, Saarbruecken (DE); Helmut Schmidt, Saarbruecken (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/979,956
(22) PCT Filed: May 17, 2000
(86) PCT No.: PCT/EP00/04453
§ 371 (c)(1), (2), (4) Date: Mar. 19, 2002
(87) PCT Pub. No.: WO00/73398
PCT Pub. Date: Dec. 7, 2000

(30) Foreign Application Priority Data

May 26, 1999 (DE) .......................... 199 24 138

(51) Int. Cl.$^7$ .......................... C04B 35/00; C09D 5/23; H01F 1/032; C08K 5/09
(52) U.S. Cl. .......................... 524/394; 524/401; 524/423; 524/431; 524/440; 524/441; 252/62.9 R; 252/62.51 R; 252/62.56; 252/62.9 PZ; 528/503; 522/71; 428/689; 977/DIG. 1
(58) Field of Search .......................... 524/394, 401, 524/423, 431, 440, 441; 528/503; 522/71; 252/62.51 R, 62.56, 62.9 R; 428/689

(56) References Cited

U.S. PATENT DOCUMENTS

| | | |
|---|---|---|
| 3,564,515 A | 2/1971 | Gratian |
| 3,620,875 A | 11/1971 | Guglielmo, Sr. et al. |
| 4,083,901 A | 4/1978 | Schonfeld et al. |
| 4,176,054 A | 11/1979 | Kelley |
| 4,254,201 A | 3/1981 | Sawai et al. |
| 4,548,862 A * | 10/1985 | Hartman .................... 428/323 |
| 4,635,415 A | 1/1987 | Schumacher et al. ....... 52/127.1 |
| 4,810,799 A | 3/1989 | Zanker et al. |
| 4,849,262 A | 7/1989 | Uhl et al. |
| 4,882,399 A | 11/1989 | Tesoro et al. ................ 525/523 |
| 5,064,494 A | 11/1991 | Duck et al. |
| 5,143,987 A | 9/1992 | Haensel et al. |
| 5,185,422 A | 2/1993 | Drouve et al. |
| 5,240,626 A | 8/1993 | Thakur et al. |
| 5,338,611 A | 8/1994 | Lause et al. |
| 5,391,595 A | 2/1995 | Clark, Jr. et al. |
| 5,574,123 A | 11/1996 | Bock et al. |
| 5,620,794 A | 4/1997 | Burkart et al. .............. 428/343 |
| 5,695,901 A | 12/1997 | Selim |
| 5,710,215 A | 1/1998 | Abend |
| 5,714,238 A | 2/1998 | Komagata et al. |
| 5,786,030 A | 7/1998 | Ahmed et al. |
| 5,800,890 A | 9/1998 | Myers |
| 5,820,664 A | 10/1998 | Gardiner et al. |
| 5,833,795 A | 11/1998 | Smith et al. |
| 5,846,426 A | 12/1998 | Boos et al. |
| 5,910,522 A | 6/1999 | Schmidt et al. ............. 523/168 |
| 5,925,455 A | 7/1999 | Bruzzone et al. |
| 5,985,435 A | 11/1999 | Czaplicki et al. |
| 5,994,422 A | 11/1999 | Born et al. |
| 6,004,425 A | 12/1999 | Born et al. |
| 6,011,307 A * | 1/2000 | Jiang et al. .................. 257/746 |
| 6,183,658 B1 | 2/2001 | Lesniak et al. .......... 252/62.56 |
| 6,245,177 B1 | 6/2001 | Luhmann .................... 156/182 |
| 6,348,548 B1 | 2/2002 | Abend |
| 6,448,338 B1 | 9/2002 | Born et al. |
| 6,472,475 B1 | 10/2002 | Lanoye et al. |
| 6,591,125 B1 | 7/2003 | Buse et al. |
| 6,592,745 B1 | 7/2003 | Feldman et al. |
| 6,602,989 B1 | 8/2003 | Sadik et al. |
| 6,605,200 B1 | 8/2003 | Mao et al. |
| 6,610,269 B1 | 8/2003 | Klaveness et al. |
| 6,613,794 B2 | 9/2003 | Hoefgen et al. |
| 6,632,899 B2 | 10/2003 | Kol et al. |
| 2003/0168640 A1 | 9/2003 | Kirsten |

FOREIGN PATENT DOCUMENTS

| | | |
|---|---|---|
| DE | 158973 | 2/1983 |
| DE | 35 01 490 | 7/1986 |
| DE | 37 09 852 | 10/1988 |
| DE | 41 30 268 | 3/1992 |
| DE | 43 28 108 | 2/1995 |
| DE | 42 30 116 | 10/1995 |
| DE | 195 02 381 A1 | 8/1996 |
| DE | 195 12 427 | 10/1996 |
| DE | 195 18 673 A1 | 11/1996 |
| DE | 195 26 351 | 1/1997 |
| DE | 196 49 893 | 6/1997 |
| DE | 196 14 136 | 10/1997 |
| DE | 197 26 282 | 12/1998 |
| DE | 197 30 425 A1 | 1/1999 |
| DE | 198 32 629 | 2/2000 |
| DE | 199 54 960 | 6/2000 |
| DE | 199 04 835 | 8/2000 |
| DE | 199 24 138 | 11/2000 |
| EP | 0 131 903 A2 | 1/1985 |
| EP | 0 212 511 A1 | 3/1987 |

(List continued on next page.)

OTHER PUBLICATIONS

Kryszewski, et al., Nanostructured conducting polymer composites–superparamagnetic particles in conducting polymers, *SYNTH. Met.* 94, pp. 99–104, XP000934280 (1998).

(List continued on next page.)

*Primary Examiner*—Tae H. Yoon
(74) *Attorney, Agent, or Firm*—Stephen D. Harper; Glenn E. J. Murphy

(57) ABSTRACT

This invention relates to adhesive compositions of which the binder system contains nanoscale particles with ferromagnetic, ferrimagnetic, superparamagnetic or piezo-electric properties. The invention also relates to dissolvable adhesive bonds and to a process for dissolving adhesive bonds.

10 Claims, No Drawings

FOREIGN PATENT DOCUMENTS

| | | |
|---|---|---|
| EP | 0 237 657 A1 | 9/1987 |
| EP | 0 356 715 A1 | 3/1990 |
| EP | 0 510 476 A1 | 10/1992 |
| EP | 0 545 033 A2 | 6/1993 |
| EP | 0 671 423 A1 | 9/1995 |
| EP | 0 521 825 | 8/1996 |
| EP | 0 922 720 A1 | 12/1997 |
| EP | 0 735 121 | 5/2001 |
| EP | 0 598 873 B1 | 9/2002 |
| GB | 1087815 | 10/1967 |
| WO | WO 87/01724 | 3/1987 |
| WO | WO 88/09712 A1 | 12/1988 |
| WO | WO 94/12582 | 6/1994 |
| WO | WO 98/05726 A1 | 2/1998 |
| WO | WO 98/05728 A1 | 2/1998 |
| WO | WO 98/51476 A1 | 11/1998 |
| WO | WO 99/03306 A1 | 1/1999 |
| WO | WO 99/07774 | 2/1999 |

OTHER PUBLICATIONS

V. R. Sastri et al., Reversible Crosslinking in Epoxy Resins, *Journal of Applied Polymer Science*, 39, pp. 1439–1457 (1990).

Kirk–Othmer, Encyclopedia of Chemical Technology, 3$^{rd}$ Edition, 15, Kapitel Microwave Technology, pp. 496–497.

R. V. Decahau et al., "Microwave Processing and Engineering", VCH, Verlagsgesellschaft, pp. 34–44 (1986).

G. Habenicht, Kleben: Grundlagen, Technologie, Anwendungen, 3$^{rd}$ Edition, Chapter 2.3.4.4. (1997).

Testing of adhesives for metals and adhesively bonded metal joints; Determination of the shear strength of single lap joints in shear by tension loading, (DIN 53 283), pp. 1–5, Deutsches Institut fuer Normung e.V., Berlin, (Sep. 1979).

J. Ray Ballinger, "Paramagnetism", Paramagnetic Material (1994–1996) at http://www.mritutor.org/mritutor/paragmag.htm.

J. Ray Ballinger, "Ferromagnetism", Ferromagnetic Material (1994–1996) at http://www.mritutor.org/mritutor/ferromag.htm.

Raymond A. Serway, "Hysteresis", Physics for Scientists and Engineers with modern Physics. Third Edition, Saunderts Golden Sunburst Series, pp. 852–862, 1992 (Abstract only, 2 pages) at http://www.ece.uic.edu/~kcha/hysteresis.htm.

Jon Dobson, "Magnetism in Matter and Magnetic Biomaterials", Centre for Science and Technology in Medicine, Keele University, Jan. 2000 at http://www.keele.ac.uk/depts/stm/magmaterials.html.

Jeff P. Anderson, et al., "Permeability and Hysteresis Measurement", 2000 CRC Press LLC, at http://www.engnetbase.com.

Wikipedia, The Free Encyclopedia, "Ferromagnetism", at http://en2.wikipedia.org/wiki/Ferromagnetism.

Wikipedia, The Free Encyclopedia, "Paramagnetism", at http://en2.wikipedia.org/wiki/Paramagnetism.

Wikipedia, The Free Encyclopedia, "Superparamagnetism", at http://wn2.wikipedia.org/wiki/Superparamagnetism.

* cited by examiner

DETACHABLE ADHESIVE COMPOUNDS

CROSS-REFERENCE TO RELATED APPLICATIONS

This application is a U.S. National Stage application filed under 35 U.S.C. § 371 of International Application No. PCT/EP00/04453, filed May 17, 2000, in the European Patent Office, claiming priority under 35 U.S.C. §§ 119 and 365 of PCT/EP00/04453 and DE 199 24 138.4, filed on May 26, 1999, in the German Patent Office.

This invention relates to adhesive compositions of which the binder system contains nanoscale particles with ferromagnetic, ferrimagnetic, superparamagnetic or piezoelectric properties. The invention also relates to dissolvable adhesive bonds and to a process for dissolving adhesive bonds.

In many branches of industry, particularly in the metal-processing industry, for example the motor industry, in the manufacture of utility vehicles and the associated supplier industries or even in the production of machines and domestic appliances and in the building industry, identical or different, metallic and non-metallic substrates are being increasingly joined together by adhesives or sealants. This method of joining structural components is increasingly replacing conventional joining techniques, such as rivetting, screwing or welding, because bonding/sealing offers a number of technological advantages. In contrast to traditional joining techniques, such as welding, rivetting, screwing, the problem of dissolving adhesive bonds and separating the bonded components has not yet been satisfactorily solved.

EP-A-735121 describes an adhesive film section for residue-free, damage-free and reversible bonding consisting of a double-sided adhesive film with a grip tab projecting from the adhesive film at which the adhesive bond can be reversed by pulling in the direction of its plane. However, this method can only be applied where the adhesive layer of the adhesive film is a contact adhesive. Unfortunately, adhesive bonds produced by this method have very poor tensile and peel strengths, with the result that this method can only used to fix small articles, such as hooks and the like, in the home.

DE-A4230116 describes an adhesive composition containing a mixture of an aliphatic polyol with an aromatic dianhydride. This adhesive composition enables the adhesive bond to be dissolved in water/alkali systems, more specifically soda solutions or alkali metal hydroxides. According to the document in question, these water/alkali-soluble adhesives are suitable for the efficient production of magnet components and other small parts, the adhesive only being used for temporary bonding during processing of the materials. Very similar adhesives are also known as labelling adhesives which enable the labels to be removed from beverage bottles and similar containers in aqueous or aqueous/alkaline medium.

DE-A4328108 describes an adhesive for floor coverings and a process for taking up the bonded floor coverings using microwave energy. To this end, the adhesive is said to be electrically conductive and softenable by a microwave unit. Solventless contact adhesives based on (aqueous) polymer dispersions containing copper powder or aluminium powder are specifically mentioned. According to the teaching of this document, the adhesive bond securing the pieces of floor covering can be dissolved by application of a microwave unit to soften the adhesive layer so that, after the layer of adhesive has softened, the pieces of floor covering can be manually removed.

WO 94/12582 describes a contact adhesive based on a mixture of an aqueous polymer dispersion, an adhesive dissolved in an organic solvent, tackifiers and finishing agents. This contact adhesive has constant adhesive strength over a broad temperature range and enables the adhesive bonds to be mechanically separated. According to the document in question, the adhesive is suitable for bonding insulation and/or parts of decorative surfaces, for example insulating materials or plastic films.

DE-A-19526351 describes a dissolving gel for lacquers, paints and adhesives based on organic solvents containing additions of wetting agents, thickeners and other typical auxiliaries. The use of the gel as a remover in the stripping of two-component lacquers is mentioned as a specific application. Although it is stated that the mixtures in question may also be used for two-component adhesives, there is no specific reference to the dissolution of the adhesive bonds. Similarly, WO 87/01724 describes a composition for removing hardened polysulfide sealants or coatings. In this case, an alkali metal or ammonium thiolate based on alkyl or phenyl thiolates is dissolved in a solvent or solvent mixture consisting of dimethyl formamide or dimethyl acetamide or a mixture thereof with aromatic solvents, such as toluene or xylene, and the resulting solution is applied to hardened polysulfide sealants or coating materials so that they may subsequently be removed from their substrates, such as aircraft tanks for example. Particulars of the dissolving of adhesive bonds are not disclosed.

In an article entitled "Reversible Crosslinking in Epoxy Resins" published in Journal of Applied Polymer Science, 39, 1429 to 1457 (1990), V. R. Sastri and G. C. Tesoro describe epoxy resins with various epoxy equivalents which are crosslinked with 4,4'-dithioaniline. The crosslinked resin is said to be ground into particles 600 $\mu$m in size. The fine-particle powder obtained is then refluxed in a solution of diglyme, hydrochloric acid and tributyl phosphine until the ground resin has dissolved. Similar disclosures are made by the same authors in US-A-4,882,399. There is no specific reference in either document to dissolvable adhesive bonds.

WO 99107774 describes adhesives of which at least one component contains disulfide or polysulfide bonds and which can be dissolved after curing by the application of solutions of splitting agents based on mercapto compounds. In this way, bonded parts can be chemically separated at the glueline. According to the teaching of this document, the splitting agent may also be incorporated in a version of the adhesive formulation which is inert at room temperature, in which case splitting can take place after activation of the reagent at elevated temperature. Actual embodiments of this inert form of the splitting agent are not mentioned. Although the use of solvent containing splitting agents enables adhesive bonds to be reversed, it is desirable to be able to dispense with solvent-containing splitting agents because this procedure is very time-consuming on account of the diffusion-based contact time of the splitting agents and the handling of solvent-containing splitting agents should be avoided on environmental grounds.

DE-A-35 01 490 describes a sheet of glass bonded into the frame of a car body using an elastomeric crosslinked adhesive. On its surface, the sheet of glass is provided in the bonding zone with a conductive strip which is equipped with electrical terminals and which, on its side facing the adhesive, carries a parting layer of a heat-meltable material, such as soft solder or thermoplastic. To reverse the adhesive joint, current is applied to the conductive strip which heats up, the parting layer melts and the sheet of glass can be removed from the body.

EP-A0521825 describes a dissolvable adhesive bond where the parts joined to one another are bonded by a strip of adhesive applied between them. This strip of adhesive contains a flat thermoplastic separating element which in turn contains intrinsically conductive polymers, electrically conductive carbon blacks, graphite, metal powder, metal fibers or metal needles, metal-coated fillers, metal-coated glass microbeads, metal-coated textile fibers or mixtures of these materials. When the adhesive bond is heated by electrical current or heat, this thermoplastic separating layer is softened so that the parts joined to one another can be mechanically separated. According to the document in question, these dissolvable adhesive bonds are suitable for direct glazing in car manufacture.

Against the background of this prior art, the problem addressed by the present invention was to provide adhesives which would enable adhesive bonds to be efficiently dissolved. After the corresponding substrates have been bonded with these adhesives, the bond would lend itself to heating by application of electromagnetic alternating fields to dissolve the adhesive bond.

DESCRIPTION OF THE INVENTION

The solution to the problem stated above is defined in the claims and consists essentially in the provision of adhesive compositions of which the binders contain nanoscale particles with ferromagnetic, ferrimagnetic, superparamagnetic or piezoelectric properties.

The present invention also relates to dissolvable adhesive bonds where the bonded parts are joined together by a layer of adhesive introduced between them, the adhesive matrix of the adhesive layer containing nanoscale particles.

The present invention also relates to a process for dissolving adhesive bonds using electrical, magnetic or electromagnetic alternating fields, the adhesive layer containing nanoscale particles which heat the adhesive layer under the influence of these alternating fields. The effect of this heating of the adhesive layer is to separate the adhesive bonds. In this connection, the nanoscale particles act as fillers with "signal receiver" properties so that energy in the form of electromagnetic alternating fields is purposefully introduced into the adhesive bond. The introduction of energy into the adhesive results in a considerable local increase in temperature so that the adhesive bond can be reversibly dissolved. In the case of nonreactive thermoplastic adhesive systems, this introduction of energy results in melting of the adhesive polymer; in the case of reactive, i.e. crosslinked, thermoset adhesive systems, the increase in temperature leads to thermal degradation of the polymer and hence to a break in the adhesive joint. In this connection, particularly preferred adhesives are those which are either thermally labile themselves or of which the polymer backbone contains individual thermally labile groups. The modification of adhesives with thermally labile additives, which can be activated by an increase in temperature and which thus initiate failure of the adhesive, may also be successfully used for the dissolvable adhesive bonds according to the invention. The process according to the invention is distinguished from conventional methods of heating by the fact that heat is generated locally in the adhesive joint and that exposure of the bonded substrate materials themselves to heat is avoided or minimized. The process saves time and is very effective because the heat does not have to be introduced into the adhesive joint through the bonded substrates by diffusion processes. This process also reduces heat losses through dissipation or radiation through the substrate to a considerable extent so that the process according to the invention is particularly economical.

Electrical alternating fields or magnetic alternating fields are suitable for the introduction of energy. Where electrical alternating fields are applied, suitable filler materials are any piezoelectric compounds, for example quartz, tourmaline, barium titanate, lithium sulfate, potassium (sodium) tartrate, ethylenediamine tartrate, ferroelectric materials of perovskite structure and, above all, lead zirconium titanate. Where magnetic alternating fields are used, any ferrimagnetic, ferromagnetic or superparamagnetic materials are basically suitable, more particularly the metals aluminium, cobalt, iron, nickel or alloys thereof and metal oxides of the n-maghemite type ($\gamma$—$Fe_2O_3$) and the n-magnetite type ($Fe_3O_4$), ferrites with the general formula $MeFe_2O_4$, where Me stands for divalent metals from the group consisting of copper, zinc, cobalt, nickel, magnesium, calcium or cadmium.

Where magnetic alternating fields are used, nanoscale superparamagnetic particles, so-called single domain particles, are particularly suitable. Compared with the paramagnetic particles known from the prior art, the nanoscale fillers are distinguished by the fact that they have no hysteresis. The result of this is that the dissipation of energy is not produced by magnetic hysteresis losses, instead the generation of heat is attributable to an oscillation or rotation of the particles in the surrounding matrix induced during the action of an electromagnetic alternating field and, hence, ultimately to mechanical friction losses. This leads to a particularly effective heating rate of the particles and the matrix surrounding them.

Nanoscale particles in the context of the present invention are particles with a mean particle size (or a mean particle diameter) of no more than 100 nm, preferably no more than 50 nm and more preferably no more than 30 nm. The nanoscale particles to be used in accordance with the invention preferably have a mean particle size of 1 to 40 nm and more preferably 3 to 30 nm. In order to utilize the effects through superparamagnetism, the particle sizes should be no more than 30 nm. The particle size is preferably determined by the UPA (ultrafine particle analyzer) method, for example by laser light back scattering. In order to prevent or avoid agglomeration or coalescence of the nanoscale particles, the particles are normally surface-modified or surface-coated. A corresponding process for the production of agglomerate-free nanoscale particles, for example iron oxide particles, is described in columns 8 to 10 of DE-A-196 14 136. Methods for the surface coating of such nanoscale particles for avoiding agglomeration thereof are disclosed in DE-A-197 26 282.

In principle, any polymers suitable for adhesives may be used as the binder matrix for the adhesives according to the invention. Examples of thermoplastically softenable adhesives are hotmelt adhesives based on ethylene/vinyl acetate copolymers, polybutenes, styrene/isoprene/styrene and styrene/butadiene/styrene copolymers, thermoplastic elastomers, amorphous polyolefins, linear thermoplastic polyurethanes, copolyesters, polyamide resins, polyamide/EVA copolymers, polyaminoamides based on dimer fatty acids, polyester amides or polyether amides. Other suitable adhesive matrixes are, in principle, the known two-pack adhesives based on one- or two-component polyurethanes, one- or two-component polyepoxides, silicone polymers (one or two components), the silane-modified polymers described, for example, in G. Habenicht "KLeben: Grundlagen, Technologie, Anwendungen", 3rd Edition, 1997, Chapter 2.3.4.4. The (meth)acrylate-functional two-pack adhesives based on peroxidic hardeners, anaerobic curing mechanisms, aerobic curing mechanisms or UV curing mechanisms are also suitable as the adhesive matrix. Actual examples of the incorporation of thermally labile groups in two-pack adhesives for the purpose of subsequently splitting these bonds are the adhesives according to WO 99/07774 of which at least one component contains disulfide or polysulfide bonds. In one particularly preferred embodiment, these adhesives may also contain solid splitting reagents in crystalline, encapsulated, chemically blocked, topologically or sterically inactivated or kinetically inhibited, finely dispersed form, as disclosed on pages 14 to 16 of hitherto unpublished DE-A-199 04 835.6. Another possibility is to use polyurethane adhesives containing the amine derivatives disclosed in hitherto unpublished DE-A-198 32 629.7 as splitting agent. The splitting agents disclosed in the two above-mentioned documents are expressly part of the present invention.

In principle, any relatively high-frequency electromagnetic alternating field may be used as the energy source for heating the nanoscale particles. For example, electromagnetic radiation of the so-called ISM (industrial, scientific and medical applications) ranges may be used, cf. inter alia Kirk-Othmer, "Encyclopedia of Chemical Technology", 3rd Edition, Vol. 15, chapter entitled "Microwave technology", for further particulars.

It was pointed out in the foregoing that, where nanoscale particles according to the invention are used, electromagnetic radiation may be used to particular effect. This is clearly reflected in the fact that, even in the low-frequency range of about 50 kHz or 100 kHz up to 100 MHz, virtually any frequency can be used to produce the amount of heat needed to split the adhesive bond matrix in the adhesive matrix. The choice of the frequency may be determined by the equipment available, care naturally having to be taken to ensure that interference fields are not radiated.

The invention is illustrated in the following by a few basic tests. The choice of the Examples is not intended to limit the scope of the invention in any way, the Examples merely serving as models to illustrate the mode of operation of the adhesive compositions according to the invention.

EXAMPLES

Example 1

Surface-modified n-maghemite with a mean particle size of 50 nm (the particle size was-measured by the UPA method—ultrafine particle analyzer or laser light back scattering) was incorporated in high-density polyethylene (HDPE).

Surface-modified magnetite was similarly incorporated in HDPE.

With a magnetite or n-maghemite content of 15% by weight, a sample of correspondingly modified HDPE could be heated to 150° C. in 3 mins. by the action of a magnetic alternating field of 300 kHz. With a filling level of 5% by weight of nanoscale particles, a time of 8 mins. was needed for heating to 150° C. In other words, the HDPE was heated well beyond its softening point in a short time by the action of a magnetic alternating field so that HDPE bonded substrates can be separated with minimal force.

The other tests were carried out mainly on the basis of three thermoplastic hotmelt adhesives commercially obtainable from Henkel KGaA, namely: a normal ethylene/vinyl acetate-based adhesive (Technomelt 0 3118, EVA 1) and two polyamide-based adhesives of medium heat resistance (Macromelt 6208, PA1) and high heat resistance (modified polyamide PA2). A selection of characteristic adhesive or material properties of the unmodified adhesives is set out in Table 1

TABLE 1

| Example | Adhesive | HR [° C.] | SS (wood/wood) [MPa] | SS (PVC/PVC) [MPa] |
|---|---|---|---|---|
| 2 | EVA 1 | 53 | 2.40 | 2.25 |
| 3 | PA 1 | 124 | 2.92 | 3.41 |
| 4 | PA 2 | 153 | 6.67 | 3.86 |

To determine the heat resistance (HR) of the bonds, two holed test specimens of beechwood and PVC measuring 100×25×4 mm were bonded with the adhesive over an area of 20×25 mm and were then stored for about 24 h at room temperature. The bonded test specimens were then hung up in a recirculating air drying cabinet (Heraeus UT 5050 EK) and a weight of 1365 g was attached. The following temperature program was then applied:
1. start at 25° C.,
2. heat from 25° C. to 50° C. in 10 mins,
3. heat from 50° C. to 200° C. over 5 h,
4. keep at 200° C. for 20 mins. and
5. cool to 25° C. in 20 mins.

The time in seconds to bond failure was indicated by means of a microprogrammer (DEP 1131). Heat resistance (HR) was calculated on the basis of the following equation:

HR [°C]=[((time measured in secs)−600)120]+50.

Shear strength (SS) was determined to DIN 53283. Test specimens of beechwood and PVC measuring 100×25=4 mm were bonded with the adhesives over an area of 20×25 mm and, after about 24 hours, were tensile-tested (Zwick 144501 Universal Tester).

The adhesives described above were modified with various amounts of nanoscale magnetite. The magnetite used was partly surface-modified for better adaptation to the polymeric adhesive matrix. The particle sizes shown in Table 2 were determined by UPA (ultrafine particle analyzer) measurements. The crystallite sizes of the magnetites were determined by X-ray structure analysis as 8 nm.

TABLE 2

| Name | Modification | Mean particle size |
|---|---|---|
| MA | None | 50 nm |
| MA-MPTS | Methacryl groups | 50 nm |
| MA-AEA | Epoxide groups | 50 nm |

The magnetites listed in Table 2 were dispersed in various filling levels in the adhesives described in Table 1. The properties of a few selected 20% by weight modified formulations are set out in Table 3.

TABLE 3

| Example | Adhesive/ filler | HR [° C.] | SS (wood/wood) [MPa] | SS (PVC/PVC) [MPa] |
|---|---|---|---|---|
| 5 | EVA 1 + 20% MA | 51 | 3.55 | 2.98 |
| 6 | PA 1 + 20% MA-MPTS | 132 | 3.33 | 3.53 |
| 7 | PA 2 + 20% MA | 169 | 4.88 | 2.29 |
| 8 | PA 2 + 20% MA-MPTS | 169 | 3.86 | 2.51 |
| 9 | PA 2 + 20% MA-AEA | 169 | 4.37 | 1.74 |

It is clear from Examples 5 to 9 that, even where the adhesive is highly filled with nanoscale magnetite, heat resistance and shear strength are generally not adversely affected, particularly when the magnetite particles were modified with a surface modifier suited to the adhesive matrix.

Influence of the "Signal Receiver" Particle Size on the Inductive Heatability of Modified Adhesives:

Basically, not only nanoscale "signal receivers", but also those with a larger particle size are suitable for the inductive heating of polymer matrixes. However, as a result of another heating mechanism which will not be described in any more detail here, the amount of energy which can be introduced where nanoscale particles are used is considerably greater than where larger particles are used. This can be illustrated by corresponding tests carried out by way of example with a modified polyester system (Dynacoll 7360, Hüls). The magnetic alternating field required was generated with a Hüttinger TIG 5/300 generator. The voltage applied was 180 V. The coil used had a diameter of 3.5 cm and 10 turns. It was part of the oscillation-producing oscillator circuit. With the voltages and dimensions mentioned, a frequency of about 250 KHz was obtained. It it is clear from Example 10 and the Comparison Example that, where nanoscale fillers are used in accordance with the invention as "signal receivers" in the adhesive matrix, the modified polyester is heated to far higher temperatures in a far shorter time than where the "coarser" magnetite particles are used. The results of the tests are set out in Table

TABLE 4

| Time [sec] | Example 10 Nano-magnetite | Comparison Sub-µ-magnetite |
|---|---|---|
| 0 | 20.4 | 18 |
| 5 | 25.9 | 20.3 |
| 10 | 34.7 | 24.1 |
| 15 | 41.2 | 27.5 |
| 20 | 46 | 30.9 |
| 25 | 48.1 | 35.1 |
| 30 | 49.9 | 38.3 |
| 35 | 50.7 | 41.1 |
| 40 | 52.4 | 43.4 |
| 45 | 62.6 | 45.2 |
| 50 | 75.1 | 46.9 |
| 55 | 85 | 47.9 |
| 60 | 93.5 | 48.7 |
| 70 | 108 | 50.5 |

TABLE 4-continued

| Time [sec] | Example 10 Nano-magnetite | Comparison Sub-µ-magnetite |
|---|---|---|
| 80 | 118 | 52.4 |
| 90 | 124.9 | 66.2 |
| 100 |  | 82 |

Influence of the "Signal Receiver" Filling Level on the Inductive heatability of Modified Adhesives:

The heating-up behavior of modified adhesives in the magnetic alternating field is highly dependent on the filling level of the signal receiver used. Corresponding tests were carried out by way of example with magnetite-modified EVA1. The magnetic alternating field required was generated with a HÖttinger TIG 5/300 generator. The voltage applied was 180 V. The coil used had a diameter of 3.5 cm and 10 turns. The results of the tests are set out in Table 5.

TABLE 5

| Example | n-Magnetite filling level [%] | Time to reach melting point (80° C.) [s] |
|---|---|---|
| 11 | 5 | 89 |
| 12 | 10 | 42 |
| 13 | 15 | 27 |
| 14 | 20 | 20 |

It is clear from Examples 11 to 14 that, as the nanoscale magnetite filling level increases, the necessary heating-up time is drastically reduced for otherwise the same conditions.

Influence of the Strength of the Magnetic Alternating Field on the Inductive Heatability of Modified Adhesives A critical factor in the inductive heating of magnetite-modified adhesives is the strength of the magnetic field applied. The resulting strength of the field in the coil is dependent inter alia on the voltage applied or the flowing current. Tests to determine the effect of different voltages were carried out with a Hüttinger TIG 5/300 generator. The maximum voltage applied was 180 V. The coil used had a diameter of 3.5 cm and 10 turns. The composition of Example 8 was used as the adhesive. The results are set out in Table 6.

TABLE 6

| Time [s] | Heating temperature [° C.] at U = [V] | | | | | | | | | |
|---|---|---|---|---|---|---|---|---|---|---|
|  | 18 V | 36 V | 54 V | 72 V | 90 V | 108 V | 126 V | 144 V | 162 V | 180 V |
| 0 | 23.8 | 23.3 | 24.1 | 24.7 | 24 | 22.7 | 25.1 | 25.7 | 21.6 | 22.3 |
| 20 | 23.9 | 23.3 | 26.6 | 29 | 35.1 | 36.5 | 47 | 54.7 | 52.5 | 65 |
| 40 | 23.7 | 24 | 29.6 | 34.5 | 45 | 50.2 | 64.6 | 79.3 | 78.5 | 98.7 |
| 60 | 24.1 | 24.9 | 32.7 | 39.1 | 53.3 | 61 | 80.6 | 98.5 | 99.8 | 121 |
| 80 | 24.8 | 25.7 | 35.1 | 44.4 | 60.3 | 71 | 95 | 114 | 118.1 | 140.6 |
| 100 | 24.6 | 26.3 | 37.6 | 48.8 | 68.5 | 81 | 106 | 126 | 134.6 | 155.5 |
| 120 | 25.3 | 26.5 | 39.9 | 52.2 | 75 | 88 | 116 | 140 |  | 170 |
| 140 | 25.1 | 27.4 | 42.1 | 56 | 80.5 | 97 | 125 | 148 |  | 178 |
| 160 | 25.8 | 28 | 44.4 | 58.8 | 85.6 | 102.8 | 133.6 | 155 |  | 191 |
| 180 | 25.7 | 28.1 | 46 | 62 | 91 | 109 | 140 | 159 |  | 198 |

It is clear from the figures in Table 6 that the heating rate of the adhesive matrix increases considerably with increasing field strength (i.e. with increasing voltage applied) so that temperatures sufficient to dissolve the bond are reached in a very short time.

Influence of Coil Geometry on the Inductive Heatability of Modified Adhesives

The field strength of the magnetic alternating field is dependent not only on the voltage applied, but also on the length and number of turns of the coli used. For a constant voltage, a field of different frequency or strength is obtained according to the length of the coil and the number of turns. Corresponding tests were carried out at a constant maximum voltage of 180 V. PA 2 modified with 20% by weight magnetite was used as the adhesive base. The coils used had a constant diameter of 3.5 cm and differed in the number of turns. The results of these tests are set out in Table 7.

TABLE 7

| t[s] | T [° C] 10 Turn-coil | T [C.] 4-Turn coil |
|---|---|---|
| 0 | 22.3 | 21.2 |
| 10 |  | 95 |
| 20 | 65 | 137 |
| 30 |  | 162 |
| 40 | 99 | 179 |
| 50 |  | 198 |
| 60 | 121 | 215 |
| 70 |  | 226 |
| 80 | 140 |  |
| 100 | 155 |  |
| 120 | 170 |  |
| 140 | 178 |  |
| 160 | 191 |  |
| 180 | 198 |  |
| 200 | — |  |
| 220 |  |  |
| 240 |  |  |

The results set out in Table 7 show that, with a shorter coil length or smaller number of turns and the resulting greater field strength, the heating rate increases significantly for the same adhesive composition.

To determine to what extent inductive heating leads to a change in the properties of the adhesive, tests were carried out in which a PA 2 modified with 20% by weight magnetite was inductively heated several times. A Hüttinger TIG 5/300 generator was used for the tests. The voltage applied was 180 V. The coil used had a diameter of 3.5 cm and 10 turns. The results obtained show that, even after repeated heating in a magnetic alternating field, the heating-up behavior of the modified adhesive remains virtually unaffected.

With thermoplastic adhesives, therefore, heating and hence the bonding of the substrates can be made reversible so that the bonded parts can be repeatedly separated and fitted back together if necessary.

Separation of Bonded Substrates in a Magnetic Alternating Field

Wood/wood and PVC/PVC laminates were produced with the modified adhesives described in Table 3. To this end, the adhesive was applied to one side, the second substrate was applied under light pressure and the resulting laminate was left for 48 hours at room temperature. The laminates were then suspended in a magnetic alternating field under a tensile shear load of 0.2 MPa or 0.6 MPa and the time to failure of the test specimen was measured. A Hüttinger TIG 5/300 field generator was used. The voltage applied was 100% of the maximum value possible with the generator used (180 V) and the coil used had 4 turns. The results are set out in Table 8.

TABLE 8

| | | Time to failure [mins:secs] | | |
|---|---|---|---|---|
| Example | Adhesive | Wood/wood L = 0.2 MPa | Wood/wood L = 0.6 MPa | PVC/PVC L = 0.2 MPa |
| 15 | EVA 1 + 20% by wt. magnetite | 0:08 | — | 0:0.6 |
| 16 | PA 1 + 20% by wt. MA-MPTS | 0:37 | 0:17 | 1:10 |
| 17 | PA 2 + 20% by wt. MA | 1:01 | 0:44 | 1:04 |
| 18 | PA 2 + 20% by wt. MA-MPTS | 2:33 | 0:57 | 1:02 |
| 19 | PA 2 + 20% by wt. MA-AEA | 1:27 | — | — |

The test results set out in Table 8 show that even high-strength bonds, such as those involving the hotmelt adhesive PA 2, can be reversed in a very short time by application of a magnetic alternating field and moderate force.

What is claimed is:

1. An adhesive composition, comprising a binder system and nanoscale particles having piezoelectric properties, wherein the nanoscale particles comprise one or more piezoelectric materials selected from the group consisting of quartz, tourmaline, barium titanate, lithium sulfate, potassium tartrate, sodium tartrate, potassium sodium tartrate, and ethylenediamine tartrate.

2. The composition of claim 1, wherein the nanoscale particles have a mean particle size of 100 nm or less.

3. The composition of claim 2, wherein the nanoscale particles have a mean particle size of 50 nm or less.

4. The composition of claim 3, wherein the nanoscale particles have a mean particle size of 30 nm or less.

5. The adhesive composition of claim 1, comprising 1% to 30% by weight of the nanoscale particles.

6. The adhesive composition of claim 5, comprising 3% to 20% by weight of the nanoscale, particles.

7. An article of manufacture, comprising two or more substrates adhesively bonded by a dissolvable layer of adhesive matrix, said matrix comprising the adhesive composition of claim 1.

8. A process for separating two or more substrates adhesively bonded by a thermoplastic adhesive matrix that comprises a thermoplastic binder and nanoscale particles having ferromagnetic, ferrimagnetic, superparamagnetic, or piezoelectric properties, said process comprising the steps of exposing the thermoplastic adhesive matrix to one or more of an electrical, magnetic, or electromagnetic alternating field whereby the matrix is heated beyond the softening point of the thermoplastic binder, and optionally separating the substrates with mechanical force.

9. A process for separating two or more substrates adhesively bonded by a thermoset adhesive matrix that comprises a crosslinked binder and nanoscale particles having ferromagnetic, ferrimagnetic, superparamagnetic, or piezoelectric properties, said process comprising the steps of exposing the thermoset adhesive matrix to one or more of an electrical, magnetic, or electromagnetic alternating field whereby the adhesive matrix is heated to a temperature that at least partly splits the crosslinked structure of the binder, and optionally separating the substrates with mechanical force.

10. The process of claim 8, wherein the nanoscale particles comprise one or more ferrimagnetic, ferromagnetic, or superparamagnetic materials selected from the group consisting of aluminium, cobalt, iron, nickel, nickel alloys, n-maghemite ($\gamma$—$Fe_2O_3$) metal oxides, n-magnetite ($Fe_3O_4$) metal oxides, and $MeFe_2O_4$ ferrites, wherein Me stands for a divalent metal selected from the group consisting of manganese, copper, zinc, cobalt, nickel, magnesium, calcium, and cadmium.

* * * * *